United States Patent
Gowayyed et al.

(10) Patent No.: US 11,100,288 B1
(45) Date of Patent: Aug. 24, 2021

(54) FACTORED NEURAL NETWORKS FOR LANGUAGE MODELING

(71) Applicant: SoundHound, Inc., Santa Clara, CA (US)

(72) Inventors: Zizu Gowayyed, San Francisco, CA (US); Bernard Mont-Reynaud, Sunnyvale, CA (US)

(73) Assignee: SoundHound Inc., Santa Clara, CA (US)

( * ) Notice: Subject to any disclaimer, the term of this patent is extended or adjusted under 35 U.S.C. 154(b) by 188 days.

(21) Appl. No.: 16/228,278

(22) Filed: Dec. 20, 2018

Related U.S. Application Data

(60) Provisional application No. 62/688,335, filed on Jun. 21, 2018.

(51) Int. Cl.
| | |
|---|---|
| *G06F 40/30* | (2020.01) |
| *G06N 3/04* | (2006.01) |
| *G06N 3/08* | (2006.01) |
| *G06F 40/284* | (2020.01) |

(52) U.S. Cl.
CPC .......... *G06F 40/30* (2020.01); *G06F 40/284* (2020.01); *G06N 3/0454* (2013.01); *G06N 3/0472* (2013.01); *G06N 3/08* (2013.01)

(58) Field of Classification Search
CPC ... G10L 15/197; G10L 15/063; G10L 15/065; G10L 15/26; G10L 15/02; G10L 15/04; G10L 15/18; G10L 15/187; G10L 15/08; G06F 40/216; G06F 40/284; G06F 40/44; G06F 16/90344; G06F 16/35; G06F 16/353; G06F 16/90332; G06F 16/3344; G06F 16/3346; G06F 40/263; G06F 40/30; G06F 40/45; G06N 3/08; G06N 7/005; G06N 20/00
See application file for complete search history.

(56) References Cited

U.S. PATENT DOCUMENTS

| | | |
|---|---|---|
| 5,155,801 A | 10/1992 | Lincoln |
| 5,201,026 A | 4/1993 | Tsuiki |
| 5,822,741 A | 10/1998 | Fischthal |

(Continued)

OTHER PUBLICATIONS

Hai-Son Le, et al., Structured Output Layer Neural Network Language Model, IEEE International Conference on Acoustics, Speech and Signal Processing (ICASSP), May 22-27, 2011, Prague, Czech Republic (Year: 2011).*

(Continued)

*Primary Examiner* — Linda Wong
(74) *Attorney, Agent, or Firm* — David R. Stevens; Stevens Law Group

(57) ABSTRACT

A factored neural network estimates a conditional distribution of token probabilities using two smaller models, a class model and an index model. Every token has a unique class, and a unique index in the class. The two smaller models are trained independently but cooperate at inference time. Factoring with more than two models is possible. Networks can be recurrent. Factored neural networks for statistical language modelling treat words as tokens. In that context, classes capture linguistic regularities. Partitioning of words into classes keeps the number of classes and the maximum size of a class both low. Optimization of partitioning is by iteratively splitting and assembling classes.

13 Claims, 6 Drawing Sheets

(56) References Cited

U.S. PATENT DOCUMENTS

| | | | |
|---|---|---|---|
| 5,835,633 | A | 11/1998 | Fujisaki et al. |
| 2012/0150532 | A1 | 6/2012 | Mirowski et al. |
| 2016/0062985 | A1* | 3/2016 | Epstein ............... G06F 40/216 704/9 |
| 2017/0084269 | A1* | 3/2017 | Shi ...................... G10L 15/063 |
| 2017/0162203 | A1* | 6/2017 | Huang ................ G10L 15/285 |
| 2017/0200066 | A1* | 7/2017 | Wang ..................... G06N 3/08 |
| 2017/0308790 | A1* | 10/2017 | Nogueira dos Santos ................ G06N 3/0454 |
| 2018/0032874 | A1* | 2/2018 | Sanchez Charles .. G06F 16/367 |
| 2018/0189628 | A1* | 7/2018 | Kaufmann ............. G06F 40/56 |
| 2018/0203852 | A1* | 7/2018 | Goyal ..................... G06N 3/08 |
| 2018/0315440 | A1* | 11/2018 | Inaba ................... G06N 3/0454 |

OTHER PUBLICATIONS

Peter A. Heeman, POS Tags and Decision Trees for Language Modeling, Proceedings of the Joint SIGDAT Conference on Embirical Methods in Natural Language Processing and Very Large Corpora, 1999, pp. 129-137 * see Section 1.1 *.

Peter F. Brown, et al., Class-Based n-gram Models of Natural Language, Journal of Computational Linguistics 1992 vol. 18 Issue 4, Dec. 1992, pp. 467-479, MIT Press Cambridge, MA, USA * see Section 3 *.

Christer Samuelsson, et al., A Class-Based Language Model for Large-Vocabulary Speech Recognition Extracted from Part-of-Speech Statistics, Acoustics, Speech, and Signal Processing, 1999. Proceedings., IEEE International Conference * see Section 3 *.

Yoshua Bengio, A Neural Probabilistic Language Model, Journal of Machine Learning Research 3 (2003) 1137-1155, Published Feb. 2003 * see Abstract *.

Ebru Arisoy, et al., Deep Neural Network Language Models, Association for Computational Linguistics HLT 2012 Workshop: Will We Ever Really Replace the N-gram Model? On the Future of Language Modeling for HLT, pp. 20-28, Montreal, Canada, Jun. 8, 2012 * see p. 24, col. 2 *.

Hai-Son Le, et al., Structured Output Layer Neural Network Language Model, IEEE International Conference on Acoustics, Speech and Signal Processing (ICASSP), May 22-27, 2011, Prague, Czech Republic * see Fig. 1 *.

Min Ma, Approaches for Neural-Network Language Model Adaptation, INTERSPEECH 2017, Aug. 20-24, 2017, Stockholm, Sweden * see Abstract, Section 4.2 *.

Joshua Goodman, Classes for Fast Maximum Entropy Training, Proceedings of ICASSP—2001, Utah, May 2001.

Frederic Morin, et al., Hierarchical Probabilistic Neural Network Language Model, InAistats Jan. 6, 2005 (vol. 5, pp. 246-252).

Andriy Mnih, et al., A scalable hierarchical distributed language model. InAdvances in neural information processing systems 2009 (pp. 1081-1088).

Dengliang Shi, A Study on Neural Network Language Modeling. arXiv preprint arXiv:1708.07252. Aug. 24, 2017.

Jerome R. Bellegarda, Exploiting latent semantic information in statistical language modeling. Proceedings of the IEEE. Aug. 2000;88(8):1279-96.

Tomas Mikolov, Recurrent neural network based language model. InEleventh Annual Conference of the International Speech Communication Association 2010.

Tomas Mikolov, et al., Extensions of Recurrent Neural Network Language Model, Speech@FIT, Brno University of Technology, Johns Hopkins University, May 25, 2011.

Andriy Mnih, Learning Distributed Representations for Statistical Language Modelling and Collaborative Filtering (Doctoral dissertation).

Oleksii Kuchaiev, et al., Factorization tricks for LSTM networks. arXiv preprint arXiv:1703.10722. Mar. 31, 2017.

J. N. Darroch, et al., Generalized iterative scaling for log-linear models. The annals of mathematical statistics. Oct. 1, 1972:1470-80.

* cited by examiner

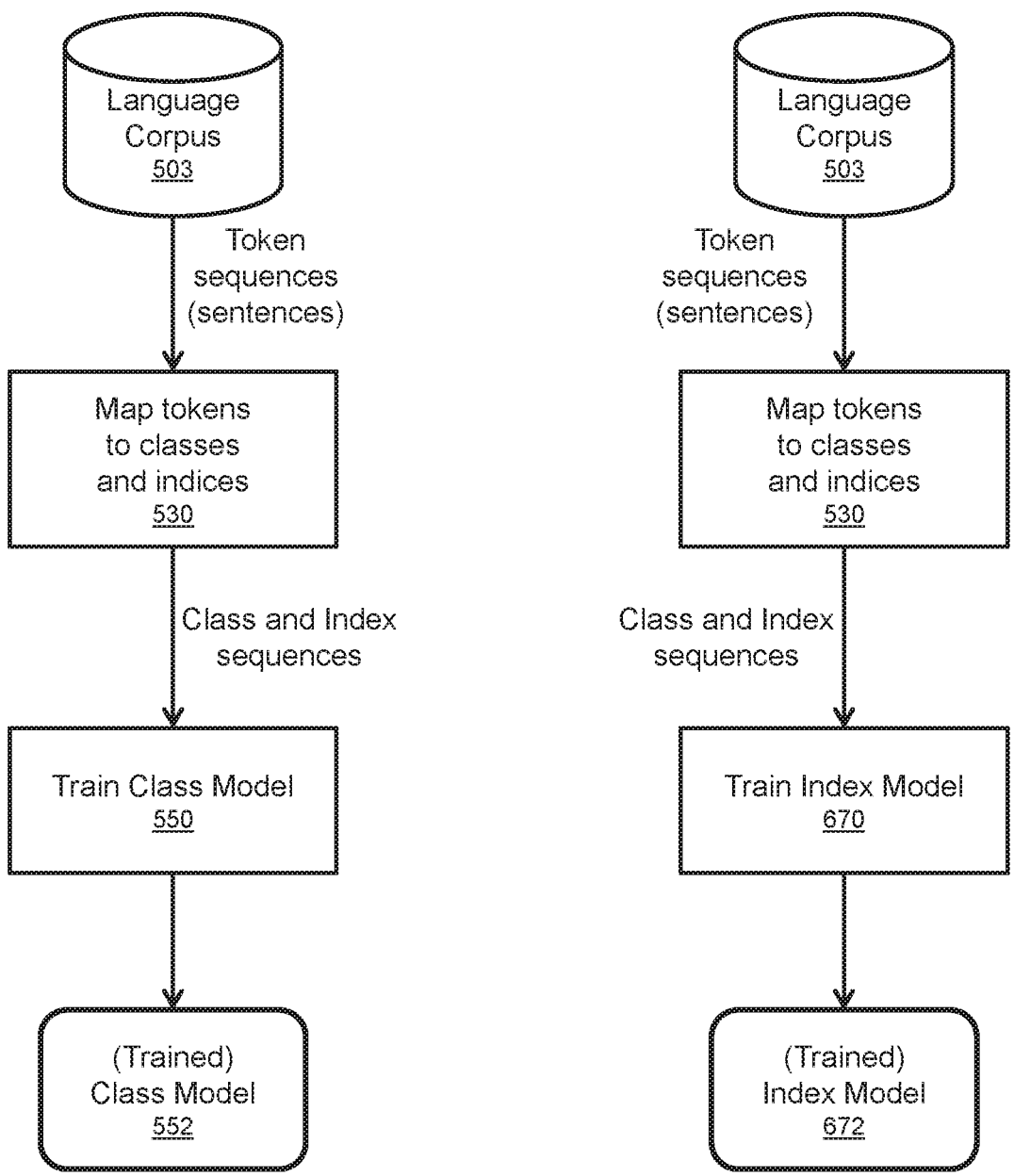

FACTORED NEURAL NETWORKS FOR LANGUAGE MODELING

This application claims the benefit of U.S. provisional patent application 62/688,335, which is incorporated herein in its entirety by reference.

FIELD OF THE INVENTION

The present invention is in the field of neural network architectures, and specifically the application of neural networks to language modeling.

BACKGROUND

In the last decade or more, supervised learning using neural networks has led to significant progress in machine learning, affecting a large number of application fields, including object detection, visual question answering, speech recognition, language modeling, and more. In many cases, neural networks have successfully competed with traditional approaches, advancing the state of the art at an accelerated pace. Deep learning and recurrent networks have been a key part of this revolution. A recent trend has been to focus on the use of end-to-end models in order to perform complex tasks using one large network rather than designing specific network components for each stage of a process. But end-to-end models can be relatively expensive in terms of footprint (measured, say, by the number of parameters) as well as training time and inference time.

Applications of Language Modeling (LM) include ASR (automated speech recognition), MT (machine translation), POS (part-of-speech) tagging, parsing, OCR (Optical Character Recognition), handwriting recognition and more. The central problem in language modeling is to estimate a conditional probability distribution. Given a vocabulary and a corpus of sentences, one trains a model that must be able to estimate the posterior probability $P(W_t|W_{t-1}; W_{t-2}; \ldots W_0)$, conditioned on the context or "history" of the previous words $W_{t-1}; W_{t-2}; \ldots W_0$.

Given the previous words $W_{t-1}; W_{t-2}; \ldots W_0$, there are three variant use cases for the LM problem: (1) estimate the posterior probability $P(W_t|W_{t-1}; W_{t-2}; \ldots W_0)$; (2) for some reasonably small integer K, list the K most likely values of $W_t$; and (3) estimate the conditional probability distribution $P(W_t|W_{t-1}; W_{t-2}; \ldots W_0)$ for all possible values of $W_t$. All three variant problems typically need to be addressed in each LM architecture. The traditional architecture for language modeling was N-gram based. Neural networks are now applied to LM, and they have a number of advantages, but they can be slow compared to N-gram models.

Neural network (NN) architectures for language modeling include feed-forward networks and recurrent networks. Unlike a feed-forward network, a recurrent neural network (RNN) is exercised iteratively, using a sequence of inputs. The RNN has internal state (called the recurrent state) that is preserved from one exercise to the next. The RNN receives a sequence of inputs over time, and upon receiving a new input, it computes both its output layer and a new recurrent state, from the input layer and the previous recurrent state. In particular, a RNN is able to extract information from the entire history of its past inputs, which is a great advantage for language modeling over feed-forward networks. However, RNN training is subject to known difficulties, such as vanishing gradients and exploding gradients. LSTM networks (and GRUs, a simplified variant) are special cases of RNNs that avoid these difficulties.

A feed-forward LM network takes as input the (N−1) previous words, and its output layer estimates the probability of every possible N-th word. The value of N might be 2, 3, 4 or 5; this plays the same role as the value of N in an N-gram model. The size of the output layer is the size |V| of the vocabulary V; for a large model, a typical vocabulary can have on the order of 1 million words. The size of a Feed-forward networks input layer is (N−1)*M nodes, where M is the number of input nodes needed to represent a word. Each word in the vocabulary can be represented in one of two ways: (1) by its projection in a low-dimensional vector space, called a "word embedding" (in this case, M would typically be a few tens to a few hundreds); or (2) by a "1-hot" Boolean vector whose size is the size of the vocabulary. The 1-hot representation has a 1 in the position that corresponds to the word, and 0s everywhere else. When using a 1-hot encoding for words, M=|V|, and the use of 1-hot encoding for words in the input layer of a feed-forward network is rather impractical, due to its large size of (N−1)*|V|.

The alternative to 1-hot encoding of words in the input layer of a feed-forward network is word-embedding vectors. A word-embedding vector typically has on the order of a few tens to a few hundreds of real-valued dimensions—this is much smaller than a 1-hot vector, that can have on the order of a million Boolean values for a large language model. Word embeddings may be learned from a counter-based model such as Latent Semantic Analysis, or a prediction-based model such as Word2Vec; each approach has multiple variants. In a neural network-based classifier, the embedding vector for a word may be retrieved from the weight matrix of the last linear transform before the final output; it is the vector of coefficients that is applied to the previous layer to compute the activation level of the last layer prior to the softmax layer. The dimension of an embedding vector is the number of nodes (a.k.a., units) in the previous layer in the network. In contrast, the dimension of a 1-hot vector is the number of final outputs.

In contrast with a feed-forward NN, a recurrent NN takes as input a single word, the most recent previous word. This is because the recurrent nature of the RNN allows it to encode the history of previous word sequences in its own state, as the words are presented one at a time. Here, too, words can be represented for input either by a low-dimensional word-embedding vector or by a 1-hot high-dimensional Boolean vector, but a 1-hot input is a viable option since its input layer has size |V|.

Neural network classifiers use a softmax output layer to ensure the final numbers can be interpreted as a probability distribution over possible outcomes. Thus, NNs of every type have a softmax layer that convert unnormalized log-probability activation levels to normalized posterior probabilities for the words in the vocabulary. When the number of outputs is large, NNs can be slow both at training time and inference time. It is not surprising that much research has been devoted to better NN architectures for LM. In a 2001 paper publication entitled "Classes for Maximum Entropy Training," (arXiv:cs.CL/0108006 9 Aug. 2001) Joshua Goodman showed that one can factor a conditional distribution, and that factoring can speed up inference: "Our speedup works by creating two maximum entropy models, the first of which predicts the class of each word, and the second of which predicts the word itself" Goodman says his idea is applicable to neural networks. Note that Goodman's use of the term "predicting" can be easily misinterpreted. When he "predicts a class," or "predicts" a word, he is merely estimating the probability of each class, or word—that is, he is computing a distribution.

Referring to a 10,000-word vocabulary, he suggests, "One could place the outputs into 100 classes. A first network could be trained to learn the class probabilities. Next, we would learn 100 neural networks, one for each class, predicting a probability for each output in that class." However, this suggestion is not as valuable as it seems, and Goodman's approach to factoring neural networks is insufficient. While it does achieve a speedup at inference time, it does little to reduce either the footprint of the model or its training time—quite the opposite. According to Goodman's approach to factoring, a speedup factor of 50 at inference time is achieved at the cost of training (and storing parameters for) 100+1 networks.

Goodman also suggested that one could introduce more levels of decomposition. A 2005 paper by Morin & Bengio entitled "Hierarchical Probabilistic Neural Network Language Models" (Aistats. Vol. 5. 2005) takes this idea to the limit: "Whereas a one-level decomposition [provides] a speed-up [of about] $\sqrt{|V|}$, a hierarchical decomposition represented by a balanced binary tree [provides] an exponential speed-up, [of about]

$$\frac{|V|}{\log_2|V|}.$$"

Morin's technique achieves indeed a very impressive speedup. It uses the bit-strings of word indices as a way to determine a binary class hierarchy, and further depends on prior knowledge extracted from the Wordnet semantic hierarchy to define suitable classes. It further relies on sharing parameters to prevent an explosion in storage requirements. Though effective, this technique is complex, as well as somewhat specialized because it depends on extensive prior knowledge.

SUMMARY OF THE INVENTION

In the absence of architectural optimizations, neural network-based language models are too costly, in terms of footprint and time (both training time and inference time), making them impractical for large vocabulary sizes. More optimized architectures still have problems with footprint and complexity. However, it is possible to factor a conditional probability distribution into two (or more) conditional distributions that can be learned independently. Factoring can drastically reduce the needed resources, by shrinking a network's footprint and speeding up both training and inference. This makes the use of large LM networks practical.

Factoring depends on partitioning a vocabulary into classes. Every vocabulary entry has a unique class, and a unique index within its class. Conversely, knowing the class and index of an entry uniquely determine the vocabulary entry. Classes and indices are defined upfront, before training occurs. The basic idea is to decompose a large language model into a class model and an index model, both much smaller than the original model. The class model learns the conditional probability distribution for the class of the next word, conditioned on the history (that is, the classes and indices of the previous words). The index model learns the conditional probability distribution for the index of the next word, conditioned on the class of the next word and the history. The factoring approach provides efficiency benefits, since it reduces model footprint, training time, and inference time by the factor $\sqrt{|V|}$, where $|V|$ is the size of the vocabulary.

For best performance of the factoring approach, the choice of partitioning into classes is extremely important. Choosing the best word classes for factoring a model affects the model's space and time efficiency, and, for a language model, it also affects the quality of the model as measured by its perplexity. Classes may be derived (1) from word embeddings, using clustering techniques (to be discussed); (2) based on syntactic or semantic tags that define an initial set of categories, and by iteratively combining such categories using operations of set intersection, set difference and set union, until efficiency and quality objectives are achieved. A third alternative is to iteratively improve a partitioning by clustering the word embeddings that the FNN learns. FNN embeddings are defined later.

The above description has emphasized language modeling and two-way factoring, but NN factoring is broadly applicable to classification or regression problems where a meaningful hierarchical grouping is available to define classes. Also, factoring can be applied to multiple levels of hierarchy, not just two.

BRIEF DESCRIPTION OF THE DRAWINGS

FIG. 5 shows the training of a class model, according to an embodiment.

FIG. 6 shows the training of an index model, according to an embodiment.

DETAILED DESCRIPTION

The following describes various embodiments of the present invention that illustrate various interesting aspects. Generally, embodiments can use the described aspects in any combination. The factoring approach has been described so far in the context of its language modeling application, but it is applicable in more generic situations, as long as hierarchical groupings exist, that can be used as classes. In order to accommodate this broader situation, the disclosure will often refer to tokens and token sequences instead of words and sentences. This said, the terms "word" and "token" are used interchangeably, as well as "sentence" and "token sequence." In contrast to words, tokens are uninterpreted, and have no linguistic properties. It will thus be understood that statements and methods that depend on linguistic properties only apply to words, not to tokens; and conversely that statements and methods that do not depend on linguistic properties apply equally to words or tokens (which include words as a special case).

A Simple Recurrent Network

Before implementing factoring in a recurrent network, it is helpful to establish a baseline for comparison, using a network architecture that does not involve factoring. As before, a model (such as a language model) is used to estimate the posterior probability of a token, conditioned on previous tokens. As before, let $P(W_t|W_{t-1}; W_{t-2}; \ldots W_0)$ denote the posterior probability of token $W_t$, conditioned on the previous tokens $W_{t-1}; W_{t-2}; \ldots W_0$. The problem of estimating $P(W_t|W_{t-1}; W_{t-2}; \ldots W_0)$ can be approached with a recurrent network.

Figure 1:
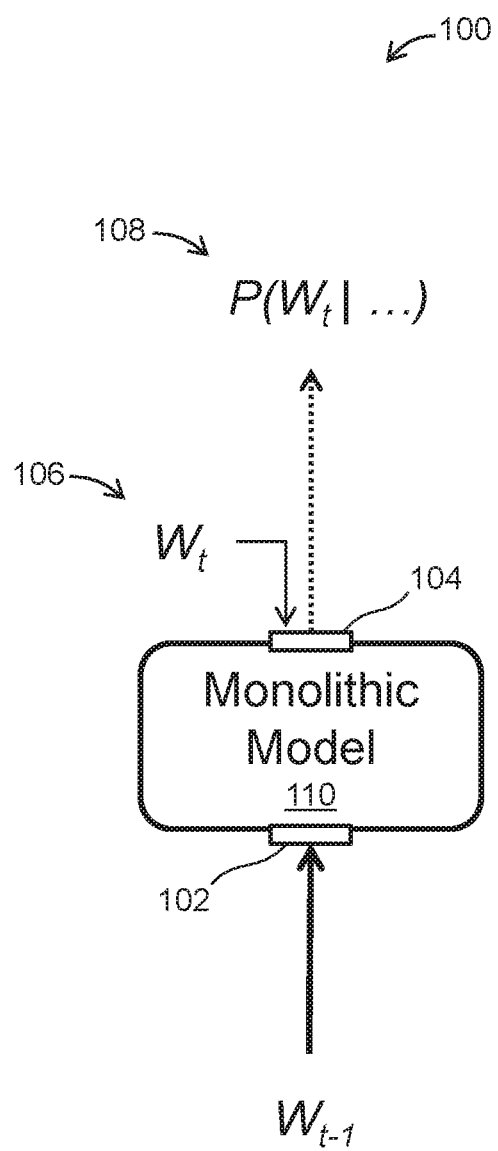
FIG. 1 shows a monolithic recurrent model, according to an embodiment.
Figure 3:
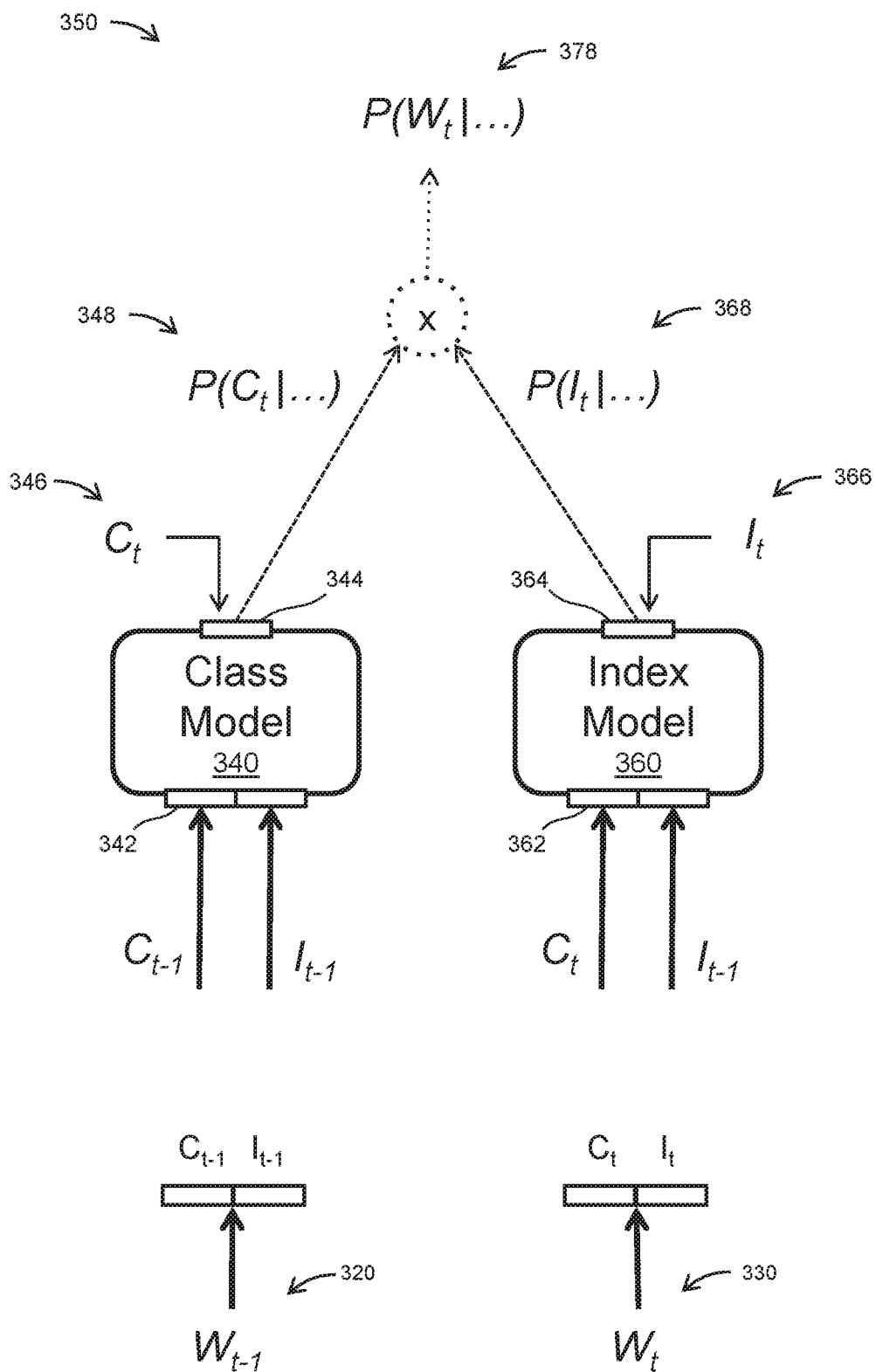
FIG. 3 shows a factored recurrent model, according to an embodiment.

FIG. 1 shows an embodiment of a simple ("monolithic") recurrent neural network that is trained to learn the distribution $P(W_t|W_{t-1}; W_{t-2}; \ldots W_0)$ from a corpus. The term monolithic is used to distinguish the network of FIG. 1 from the factored networks that are shown in FIG. 3. Because network model 110 is recurrent, it only needs $W_{t-1}$ as input. The input layer 102 of RNN 110 is a 1-hot vector encoding of $W_{t-1}$, whose dimension is the size |V| of the vocabulary V, such as e.g. $10^6$ for a million-word vocabulary. An alternative embodiment of the input layer 102 is a low-dimensional vector embedding of $W_{t-1}$. The output layer 104 of network 110 is a softmax layer whose dimension is also |V|. The recurrent network of FIG. 1 computes an estimate of the probability $P(W_t| \ldots W_{t-1}; W_{t-1}; \ldots W_0)$ for each word $W_t$. The final output 108 is an estimate of the posterior probability $P(W_t| \ldots )$ for a given vocabulary entry $W_t$; it is obtained by looking up the softmax output vector 104 at the position corresponding to the "probe" $W_t$ 106. It is important to note that the probe position $W_t$ is neither an input nor an output of the neural network 110. The output of model 110 is the softmax layer—a vector of probabilities, and $W_t$ is only used to look up the corresponding probability in the softmax output layer 108.

The training of monolithic model 110 is done according to conventional techniques for training recurrent networks. In a later section, more details will be given, especially in regard to FIGS. 5-6 and the training of factored networks. The softmax layer of monolithic model 110 can have a huge dimension ($10^6$ for a one million vocabulary); hence the model has a large footprint, and it runs slowly during both inference and training. These issues are addressed by factoring the network.

Factoring Approach

Factoring depends on partitioning a given vocabulary (a set of tokens) into classes. Each token belongs to exactly one class. Each class has at least one token. Classes are thus non-empty, non-overlapping sets of tokens, and the union of the classes is the entire vocabulary. In standard mathematical terminology, such a set of classes is called a partition of the vocabulary; but the noun "partitioning" is used instead, to avoid a possible confusion, because the term "partition" is often interpreted as being one of the classes, rather than the set of classes.

A choice of partitioning is represented, or encoded, by a mapping function (Split) and the inverse mapping (Assemble). The Split function maps a token W to a pair (C, I) consisting of a class C, the class that contains token W, and an index I, the index of W within class C; the value of index I is between 1 and |C|, where |C| is the size of class C. The pair (C, I) uniquely characterizes W. The inverse mapping, Assemble, maps a pair (C, I) to a corresponding token W. More precisely, given a pair (C, I) where C is a class and $1<=I<=|C|$, Assemble (C, I) returns a token W whose class is C and whose index is I. A variety of data structures may be used to represent the Split and Assemble functions in different embodiments. For Split, the components of the pair (C, I) can be concatenated as a single compound output. For Assemble, the components of the pair (C, I) can be concatenated as a single compound input. In some embodiments, both functions are implemented as hash maps.

Figure 2:
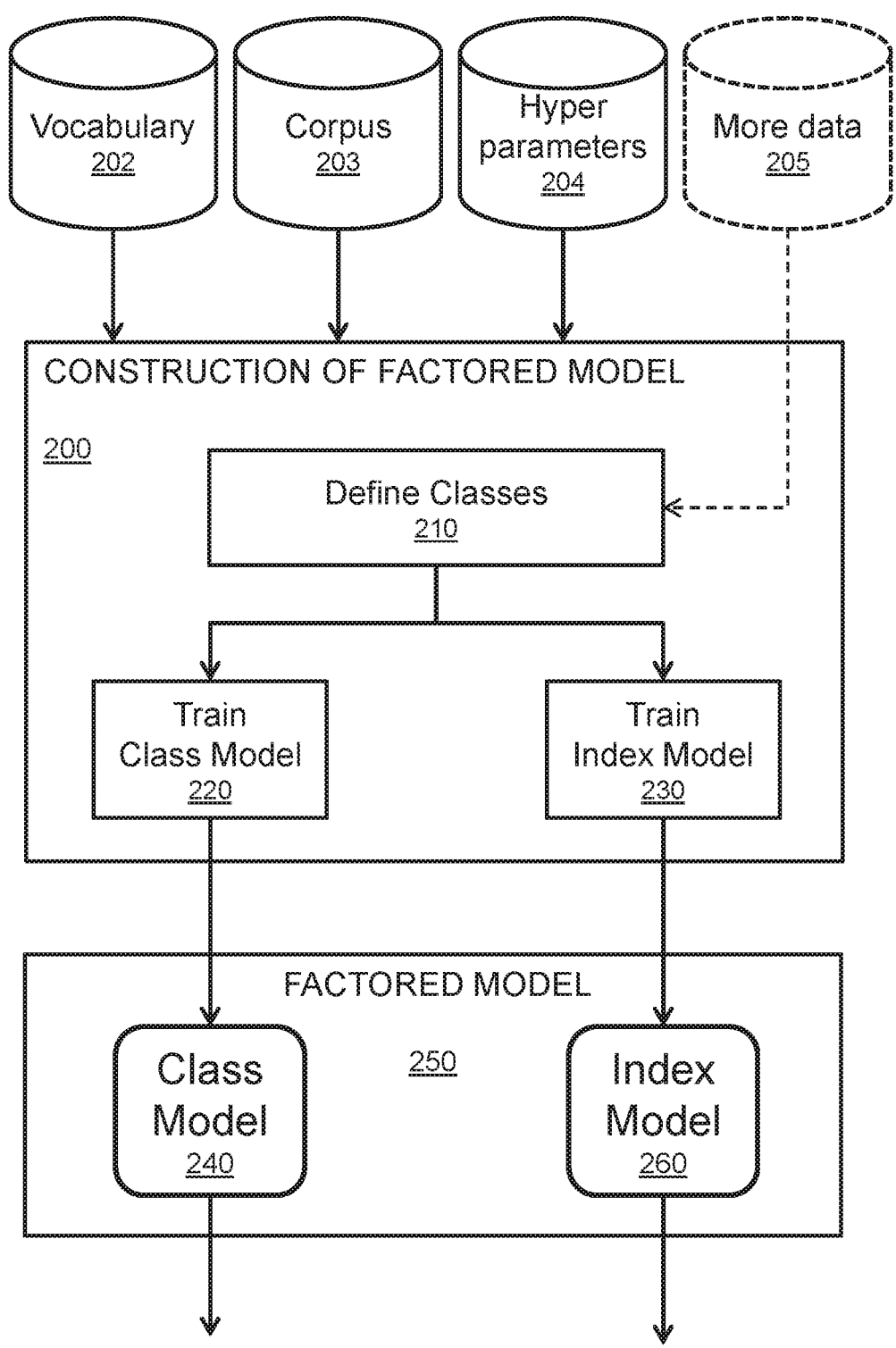
FIG. 2 shows a high level view of the steps in a factoring approach to language modeling, according to an embodiment.

FIG. 2 shows a high level view of the steps in a factoring approach to language modeling, in an embodiment. A factored neural network model 250 consists of two independent networks, a class model 240 and an index model 260. The class model's output is a probability distribution over classes, conditioned by the previous words. The distribution is computed in a softmax final layer of the class model. The index model's output is a posterior probability distribution over indices, conditioned by a current word class and by the previous words. The distribution is computed in a softmax final layer of the index model.

The construction 200 of factored model 250 takes as input: a vocabulary 202, which consists of tokens; a corpus 203, consisting of token sequences; hyperparameters 204; and possibly additional data 205. Every token in the corpus 203 is part of the vocabulary 202. The hyperparameters 204 are used to control certain aspects of the construction 200, including the structure and size of the recurrent networks used as class model 240 and index model 260; this includes the number of classes, M, and the maximum size of a class, N. The optional additional data 205, if any, are used to assist the definition of classes 210.

The first step in the construction 200 of factored model 250 is to Define Classes 210. Optional data 205 may supply prior knowledge that helps define meaningful classes in step 210. An example of optional data is part of speech information for words in the vocabulary. Another example are lists of similar words such as person names or place names. Many algorithms relevant to defining classes 210 will be discussed later. In all cases, the classes created will form a partitioning of the vocabulary, and the partitioning results in the definition of Split and Assemble functions that map tokens to (class, index) pairs and back.

The combination of the trained class model and the trained index model determines the factored model 250. Once built, factored model 250 may be used in a variety of applications 270, such as estimating posterior probabilities of tokens, conditioned by sequences of previous tokens, and others that will be described.

Key Equations

Returning to factoring, the function Split maps token $W_j$ to class $C_1$ and index $I_j$. The conditional distribution of interest may then be factored as follows (Eq. 1):

$$P(W_t \mid W_{t-1}; W_{t-2}; \ldots W_0) = P((C_t, I_t) \mid W_{t-1}; W_{t-2}; \ldots W_0) =$$
$$P(C_t \mid W_{t-1}; W_{t-2}; \ldots W_0) * P(I_t \mid C_t; W_{t-1}; W_{t-2}; \ldots W_0)$$

To implement this equation in a factored model architecture, it is useful to expose classes and indices separately, as in (Eq. 2):

$$P(W_t|W_{t-1};W_{t-2}; \ldots W_0)=$$
$$P(C_t|C_{t-1};C_{t-2}; \ldots C_0;I_{t-1};I_{t-2}; \ldots I_0)*P(I_t|C_t;C_{t-1};C_{t-2}; \ldots C_0;I_{t-1};I_{t-2}; \ldots I_0)$$

Exemplary Embodiment

FIG. 3 shows an embodiment of a factored model that implements Eq. 2 as a recurrent neural network. It is represented in the same style as FIG. 1, but the monolithic recurrent model 110 of FIG. 1 is factored into two models, class model 340 and index model 360. Class model 340 estimates the probability $P(C_t|C_{t-1}; C_{t-2}; \ldots C_0; I_{t-1}; I_{t-2}; I_0)$ for a given $C_t$, conditioned on the history. This probability is shown in FIG. 3 as $P(C_t| \ldots )$. Because the model is recurrent, it only needs $C_{t-1}$ and $I_{t-1}$ as inputs. Similarly, index model 360 estimates the index probability $P(I_t|C_t; C_{t-1}; C_{t-2}; \ldots C_0; I_{t-1}; I_{t-2}; \ldots I_0)$, conditioned on both the class $C_t$ and the history. This probability is shown as $P(I_t| \ldots )$. Because the model is recurrent, it uses $C_t$ and $I_{t-1}$ as inputs—a detailed argument that $C_{t-1}$ is not needed is given later. The product of $P(C_t| \ldots )$ and $P(I_t| \ldots )$ is the desired posterior probability $P(W_t| \ldots )$ according to Eq. 2.

Class Model

Class model 340 is a recurrent neural network (RNN) trained to learn the conditional distribution $P(C_t|C_{t-1}; C_{t-2}; C_0; I_{t-1}; I_{t-2}; I_a)$. The input size of the class model is M+N, where M is the number of classes and N is the size of the largest class. This is because the input layer 342 to Class Model 340 consists of a 1-hot representation of class $C_{t-1}$ (a vector of size M) and a 1-hot representation of index $I_{t-1}$ (a vector of size N, which can accommodate an index in the largest class). The joint input is a 2-hot input. The output layer 344 of the class model is a softmax layer over the possible classes $C_t$; it has size M. Given a class $C_t$, the conditional probability $P(C_t| \ldots )$ can be looked up in the softmax layer vector 344 at the position to the probe $C_t$. Note that the probe position $C_t$ 346 is neither an input nor an output of neural network model 340. The output of class model 340 is a vector 344 of probabilities, and $C_t$ is used as a probe position after vector 344 has been computed, to look up the corresponding probability 348 in the output layer.

Index Model

Index Model 360 is a recurrent neural network separately trained to learn the distribution $P(I_t|C_t; C_{t-1}; C_{t-2}; C_0; I_{t-1}; I_{t-2}; I_0)$. This recurrent neural network encodes the history of past classes and indices, by virtue of receiving as input a class $C_t$ and index $I_{t-1}$. Receiving these inputs is sufficient to supply the history, including $C_{t-1}$, because input sequences are presented to the recurrent network in temporal order. In particular, $C_{t-1}$ was input to the index model before $C_t$, and it does not have to be presented again. This essential point will be further discussed when considering the various use cases for the factored model. The input layer to Index Model 360 is a 2-hot vector representing $C_t$ and $I_{t-1}$, by concatenating a 1-hot vector for $C_t$ and a 1-hot vector for $I_{t-1}$. The input size of the index model is M+N, same as the class model.

The output layer 364 of Index Model 360 is a softmax layer that expresses a probability distribution over the possible values of the index $I_t$. The output size is N, the maximum size of a class. Note that the probe position $I_t$ 366 is neither an input nor an output of neural network model 360. The output of class model 360 is a vector 364 of probabilities, and $I_t$ is used as a probe position after vector 364 has been computed, to look up the corresponding probability 368 in the output layer.

In some embodiments, class model 340 and index model 360 are LSTMs (Long Short-Term Memory) networks. Compared to simple RNNs, LSTMs have a greater ability to handle long-range dependencies. For example, given the sentence "I'm going to Boston. When I get there I will find a good restaurant and order some . . . " a well-trained LSTM could be able to remember the distant word "Boston" to assign a high probability to the next two words being "clam chowder"—since this is something people frequently talk about when ordering at restaurants in Boston—whereas the LSTM would pay almost no attention to the more recent words "will", "a", and "and" because they are not very useful for future word prediction.

Use Cases of the Factored Model, and their Logic

The factored model of FIG. 3 may be applied to several situations, each of which solves a specific problem, and requires different "glue logic" to guide the operation of the model, and to extract the desired output. The Factored Model 250 of FIG. 2 comprises the Class Model 340, Index Model 360, and all of the glue logic appropriate for each use case. The glue logic includes overall sequencing, and the handling of inputs 320 and 330 and output 378.

Given the history $W_{t-1}; W_{t-2}; \ldots W_0$, one can distinguish three use cases for the LM model, each of which defines a corresponding problem:

Problem 1: estimate $P(W_t|W_{t-1}; W_{t-2}; \ldots W_0)$ for a single, given token $W_t$;

Problem 2: estimate $P(W_t|W_{t-1}; W_{t-2}; \ldots W_0)$ for all possible values of $W_t$;

Problem 3: list the K most likely values of $W_t$, for a given small integer K.

Problem 1: Single Token Posterior Probability

Problem 1 is to estimate the posterior probability $P(W_t|W_{t-1}; W_{t-2}; \ldots W_0)$ for a given word $W_t$, and a given history $W_{t-1}; W_{t-2}; \ldots W_0$. Since $W_t$ is known, class $C_t$ and index $I_t$ are as well, but none of the probabilities are. According to Eq. 2, the posterior probability $P(W_t| \ldots )$ is the product of class probability $P(C_t| \ldots )$ and index probability $P(I_t| \ldots )$, where $C_t$ and $I_t$ are the known class and index of $W_t$, and " . . . " denotes the history. Class probability $P(C_t| \ldots )$ 348 is obtained by looking up the softmax output vector 344 of class model 340, using $C_t$ as a probe position 346. Similarly, index probability $P(I_t| \ldots )$ 368 is obtained by looking up the softmax output 364 of index model 360, using $I_t$ as a probe position 366.

Figure 4:
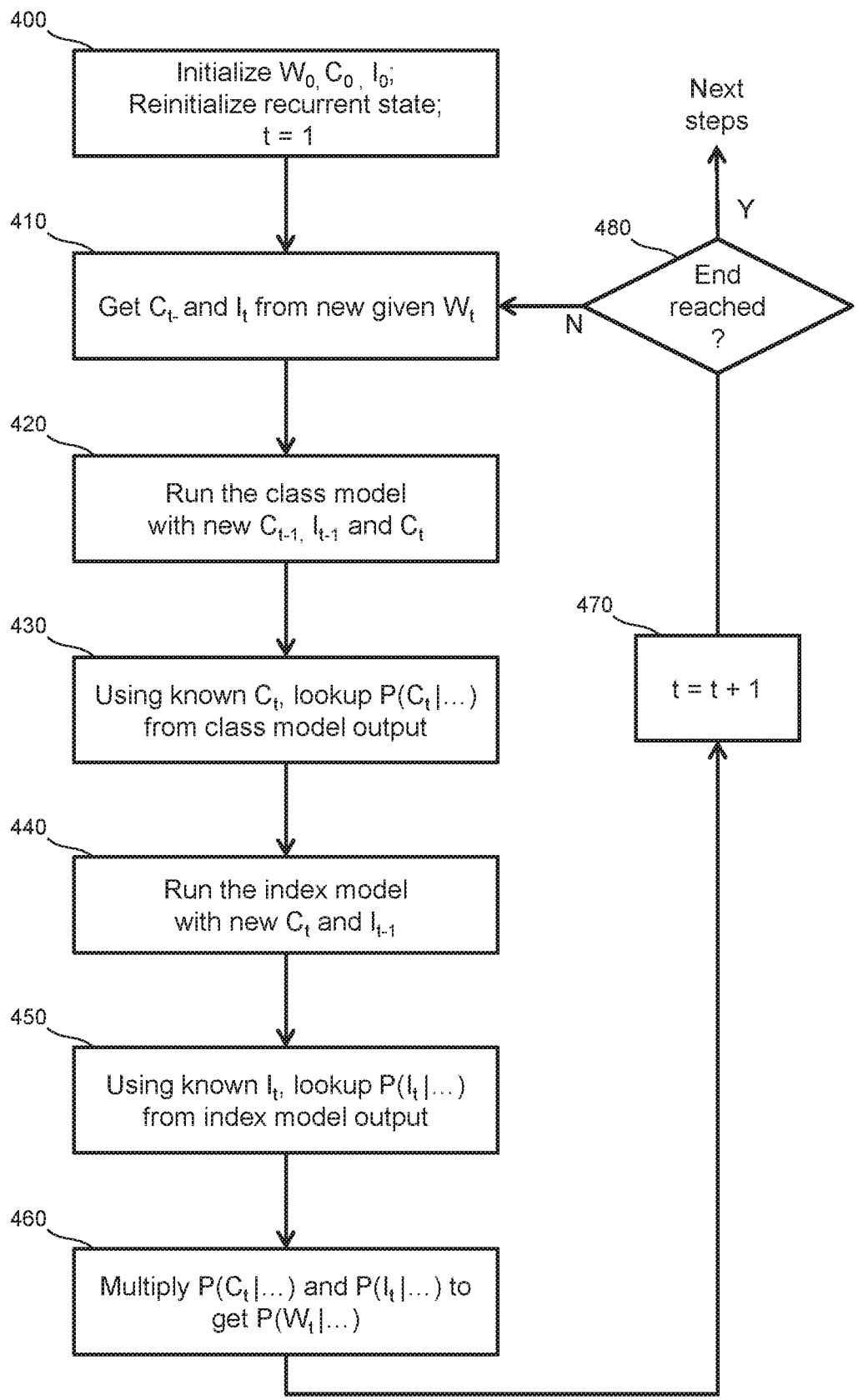
FIG. 4 shows the steps to compute a posterior probability, according to an embodiment.

FIG. 4 shows algorithmic steps to address Problem 1, in an embodiment of a factored recurrent network. The algorithm involves iterating over successive tokens in a token sequence $W_0 W_1 \ldots W_{t-1} W_t$ at successive sequence positions $W_0, W_0 W_1, W_0 W_1 W_2 \ldots, W_0 W_1 W_{t-1} W_t$. The following description refers both to the data flow aspect (shown in FIG. 3) and the control flow aspect (shown in FIG. 4).

In an embodiment, the token sequence begins (at $W_0$) with a special token that acts as a "beginning of sequence" marker for tokens. $C_0$ and $I_0$ correspond to a "beginning of sequence" marker, following the standard in neural language modeling. In some embodiments, these three markers have the same code. The initialization step 400 that assigns $C_0$ and $I_0$ also resets the recurrent state of the network (both the class model 340 and the index model 360) to their initial value, then sets t=1. At each stage of the computation (i.e., for each value of t) the factored network receives a single input token $W_t$ 330, which the Split function maps to a class $C_t$ and index $I_t$. The token $W_{t-1}$, or rather class $C_{t-1}$ and index $I_{t-1}$, are just delayed copies of $C_t$ and $I_t$, except for $C_0$ and $I_0$ which are explicitly initialized. When t is incremented in step 470, to prepare to advance by another token, the values of $C_t$ and $I_t$ are implicitly become those of $C_{t-1}$ and $I_{t-1}$. If an "end of sequence" is reached 480, the process continues with next steps beyond the current iteration. Otherwise, the new value of $W_t$ is mapped 410 to $C_t$ and $I_t$.

The algorithm then runs 420 one iteration of the class model 340. This computes, in the class model's softmax output layer 344, the distribution $P(C_t| \ldots)$, conditioned on the previous tokens (equivalently, on the previous classes and indices)—which, for the recurrent model, amounts to inputs $C_{t-1}$ and $I_{t-1}$. Using the known $C_t$ to determine a probe position in output layer 344, a simple lookup 430 determines the value of $P(C_t| \ldots)$ 348. The algorithm then runs 440 one iteration of the index model 360. This computes, in the index model's softmax output layer 364, the distribution $P(I_t|C_t; C_{t-1}; \ldots C_0; I_{t-1}; \ldots I_0)$, conditioned on the current class $C_t$ and the previous classes and indices. In the recurrent index model, inputs $C_t$ and $I_{t-1}$ are sufficient to do this. This is because the $C_{t-1}$ input is obtained by an implicit delay by 1 between $C_t$ and $I_{t-1}$, except for $C_0$, but $C_0$ is a known constant. The shift that amounts to using inputs $C_t$ and $I_{t-1}$ is obtained by training the index model with the same shift. Using the known $I_t$ to determine a probe position in output layer 364, a simple lookup 450 determines the value of $P(C_t| \ldots)$ 368. The two conditional probabilities are multiplied together 460 to get the desired posterior probability. During this step, results may also be stored as appropriate. The algorithm presented to address problem 1 is now ready for another iteration 470, if any 480. A different but mostly equivalent description of the algorithm, for a single iteration, is Algorithm 1 below:

---

Algorithm 1

```
if (t == 1) {
  Reset the class model recurrent state to the initial recurrent state;
  Reset the index model recurrent state to the initial recurrent state;
  Set (C_{t-1},I_{t-1}) = (C_0,I_0) // C_0,I_0 are known constants
} else /* if needed only */ {
  Restore class model recurrent state from previous iteration
  Restore index model recurrent state from previous sequence position
  Set (C_{t-1},I_{t-1}) = (C_t,I_t), from previous sequence position
}
Set (Ct,It) = Split(Wt)
Run the class model with inputs C_{t-1} and index I_{t-1};
Get the value of P(C_t | . . . ) from the softmax output of the class model;
Run the index model with inputs C_t and index I_{t-1};
Get the value of P(I_t | . . . ) from the softmax output of the index model;
Set P(W_t | . . . ) = P(C_t | . . . ) * P(I_t | . . . );
/* if needed */ Store class model recurrent state for next position
/* if needed */ Store index model recurrent state for next position
```

---

Two detailed aspects of Algorithm 1 are worth discussing. First, the handling of the class and index model recurrent state. If the algorithm is simply iterated, as shown in FIG. 4, over the unbroken token sequence $W_0, W_1, \ldots, W_{t-1}, W_t$, there is no need for Algorithm 1 to store and restore the class and index model recurrent state between sequence positions. However, if the token sequence that the recurrent model receives is not in sequential order, the recurrent state has to be stored and restored between each interruption. The idea of storing the recurrent state of a model after running it, and restoring the state before running again, is essential to doing any kind of parallel (or backtracking) search through a set of possibilities. For example, when a language model is used to predict the probability of a specific path in a word lattice, crossing an arc in the lattice advances a model by one token; such an advance must (with exceptions) start by restoring the recurrent state, and (with exceptions) end by saving the new recurrent state. The recurrent state is saved along with other local variables such as the current word, the current probability score, etc.

Problem 2: Entire Conditional Distribution

Problem 2 is to compute the conditional probability distribution $P(W_t| \ldots)$ for all tokens Wt, and for a given history $W_{t-1}; W_{t-2}; \ldots W_0$. A possible algorithm for this, Algorithm 2, has a lot in common with Algorithm 1, described in FIG. 4, but there are several important differences. In order to iterate over all possible tokens $W_t$ for a given t, Algorithm 2 iterates over all possible classes $C_t$, and for each class, over all possible indices $I_t$ for class $C_t$. The algorithm is loosely expressed as follows:

Algorithm 2

// Identify appropriate initial recurrent state for class and index models
Set class model recurrent state to appropriate initial recurrent state;
Run the class model with inputs $C_{t-1}$ and index $I_{t-1}$;
For each possible class $C_t$:
    Get the value of $P(C_t| \ldots)$ from the softmax output of the class model;
    Set index model recurrent state to appropriate initial recurrent state;
    Run the index model with inputs $C_t$ and index $I_{t-1}$;
    For each possible index $I_t$:
        Get the value of $P(I_t| \ldots)$ from the softmax output of the index model;
        Set $W_t$=Assemble($C_t,I_t$);
        Set $P(W_t| \ldots )=P(C_t| \ldots )*P(I_t| \ldots )$;

This algorithm runs the class model once, and the index model N times—once for each class. It is essential to use the correct ("appropriate") recurrence state before running a recurrent model. When Algorithm 2 is executed as part of running a sequence $W_0, W_1, \ldots, W_{t-1}$ forward, the "appropriate initial recurrent state" for the class and index models simply includes the current recurrent state of both models. In other cases, the "appropriate initial recurrent state" must be put in place before proceeding with Algorithm 2 itself. Note, in particular, how it would be incorrect to run Algorithm 2 without setting the index model recurrent state every time before running the model. Doing so would violate an assumption made about the order of operations—namely that the algorithm is applied in forward order across a time sequence $W_0, W_0, \ldots, W_{t-1}$. This assumption is important for the proper maintenance of the recurrent state of recurrent networks.

Problem 3: K Most Likely Tokens

Problem 3 is a variation of Problem 2, designed to minimize inference time. The goal is to enumerate only the K most likely values of $W_t$, for a given integer K and a given context. This use case is called "beam search." When K=1, it amounts to best-first search—a totally greedy algorithm that is efficient but lacks resilience—it can miss the correct solution in some cases. As the value of K increases, the computational load also increases, and the algorithm becomes less greedy and more reliable. As long as K is not too large, the beam search algorithm is considerably faster than exhaustive search. Algorithm 3, described below, has much in common with Algorithm 2. The specific embodiment makes use of an efficient data structure called a priority queue—a data structure which supports (at least) the operations of: initializing an empty queue of a given size; adding to the queue an element (comprising a key and a numeric value, used as a priority); and removing the element with the highest priority. The particular data structure is preferred because add and remove operation take time that is logarithmic in the size of the queue, but many other implementations are possible.

Algorithm 3

```
// Identify appropriate initial recurrent state for class and
    index models
Set class model recurrent state to appropriate initial recur-
    rent state;
Run the class model with inputs and index $I_{t-1}$;
Determine the K most likely classes; // can use a priority
    queue of size K
Create an empty "likely tokens" priority queue of size K to
    hold the results;
For each class $C_t$ among the K most likely classes:
    Get the value of $P(C_t| \ldots)$ from the softmax output of the
        class model;
    Set index model recurrent state to appropriate initial
        recurrent state;
    Run the index model with inputs $C_t$ and index $I_{t-1}$;
    Lookup K most likely indices; // can use a priority queue
        of size K
    For each possible index $I_t$ among the K most likely
        indices:
        Get the value of $P(W_t| \ldots)$ from the softmax output
            of the index model;
        Set $W_t$=Assemble($C_t$, $I_t$);
        Set $P(W_t| \ldots) = P(C_t| \ldots) * P(I_t| \ldots)$;
        Add token $W_t$ with priority $P(W_t| \ldots)$ to the "result"
            priority queue;
Enumerate elements of the result priority queue while
    removing them.
```

Computational Cost Analysis

The factored neural network architecture can be directly compared to the monolithic network architecture in terms of computational costs, including storage requirements, training time and inference time. Analysis results can be expressed with the familiar "big-O" notation. For example, it is well known that algorithms exist to sort n items in O(n Log (n)) Time in the worst-case. We also write A~B when both A=O(B) and B=O(A) hold, that is, if A and B are within a constant ratio of each other.

Since the exact structure of the recurrent networks of interest (in terms of the number and size of hidden layers) is not known, some assumptions must be made to carry out the analysis of costs. A reasonable assumption we can make about all these networks is that their hidden layers are not too large, compared to input and output layers. Specifically, we assume that H=O(S), where H is the maximum size of any hidden layer and S is the maximum size among the input and output layer (if there is no hidden layer, we let H=S). It follows that (1) the cost of the first (input-side) matrix multiply is O(H·S); (2) the cost of the last (output-side) matrix multiply is also O(H·S); the cost of matrix multiplications between hidden layers, if any, is also O(H·H), which is also O(H·S). Adding up all the costs, and further assuming that matrix multiplications dominate all other costs, such as non-linearities and softmax, which is reasonable, we conclude that InferenceTime~H·S for any of the networks of interest, such as those shown in FIG. 1 (monolithic model) and FIG. 3 (class and index model). Under the same assumptions, and for the same reasons, the "footprint" (or size of the parameter space) for the model is also ~H·S.

Let's turn to comparing inference times between the factored model and the monolithic model. These comparisons must handle separately the three use cases and their corresponding problems and algorithmic solutions. Algorithm 1 (for Problem 1) runs the class model once and the index model once. The cost of running the class model, with its input layer of size M+N and its output layer of size M, is ~H1(M+N), where H1 is the maximum layer size among the first and the last hidden layers in the class model; this equation assumes that the cost contributed by intermediate layers, if any (layers other than the first and last layers) does not exceed the sum of the costs of the first and the last layers for the class model—this is a very plausible assumption. Similarly, and according to a similar analysis, the cost of running the index model (with its input layer of size M+N and its output layer of size N) is ~H2(M+N), where H2 is the maximum layer size of a hidden layer in the index model. The total cost is thus ~H3(M+N), where H3 is max(H1, H2). For efficiency, one aims to choose classes so as to minimize this cost.

The cost of Algorithm 1 is minimized when M+N is minimized. This is correct if we assume H3 constant, but one can also argue it holds if hyperparameters H1 and H2 are chosen so that H3 is increased monotonically with (M+N), which seems highly plausible. Recalling that N is the size of the largest class, one can minimize N, given M, by giving all M classes more or less the same size, resulting in N~|V|/M and therefore N~sqrt(|V|) and M~sqrt(|V|). Such a factored network is said to be balanced, that is N is ~|V|/M, N~sqrt (|V|) and M~sqrt(|V|). To minimize M+N~M+|V|/M, one chooses a balanced factored network. In particular, all classes have approximately the same size. We will discuss later how to define classes that have approximately the same size.

As discussed above, the inference time of a balanced factored network, ~(H1(M+N))+~(H2(M+N)), is ~H3(M+ N), where H3=max(H1, H2) as before. We compare this with the inference of a monolithic network such as FIG. 1. According to an identical analysis to the one performed above for the class and the index networks, the inference time of a monolithic network such as FIG. 1 for a vocabulary of size |V| is ~(H0·|V|), where H0 is the maximum size of a hidden layer in the monolithic model. One is tempted to conclude right away that the factoring technique yields a ~sqrt(|V|) reduction in footprint. This argument would be weak if H3 were much larger than H0. However, it is fair to assume that, to the contrary, H0 is larger (and perhaps substantially larger) than H3, because the internal layers of the monolithic network (including the first and last internal layers) must be large enough to encode |V| outcomes in its state, whereas the internal layers of a class (or index) network need only be large enough to encode ~sqrt(|V|) outcomes. Hence, under plausible assumptions, this analysis of inference times is that factoring a network will result, in practice, in a reduction of at least sqrt(|V|) over a monolithic recurrent network.

On a first approximation, under the assumptions made above, the footprint of a network is directly proportional to its is inference time, and the analysis made above shows that factoring a network will result, for all practical purposes, in a sqrt(|V|) speedup for Problem 1 for footprint, compared to a monolithic recurrent network.

Turning to inference time for Problem 2, Algorithm 2 runs the class model once, and the index model M times. The inference time is ~(H1(M+N))+~(H2·M(M+N)), which is ~(H2·|V|). Contrast this with the inference time of the monolithic network of FIG. 1, which only needs to run once to deliver the entire distribution. The inference time at least is —(H0·|V|), where H0 is the size of the largest hidden layer in the monolithic model. One could plausibly argue that H0 ought to be substantially larger than H3=max(H1, H2) as explained above. This is a relatively convincing heuristic argument but it does not have a firm mathematical basis. Hence, the conclusion of this quick analysis of inference time for Problem 2 is that, although likely to improve performance, factoring does not result in a demonstrably valid speedup over a monolithic recurrent network.

Regarding inference time for beam search (Problem 3), observe that (1) the monolithic network only needs to run once to determine the K most likely tokens; (2) the factored network needs to run the class model once, but the index model has to run K times, once for each of the K best classes—causing it to lose a factor K in speed. Skipping over details that previous analyses had covered, we conclude that the speedup from factoring is $\sim\sqrt{|V|}/K$.

In regard to inference time for training, observe that (1) we train separately a class model and an index model, which both have an input and output layer size $\sim\sqrt{|V|}$, a reduction of $\sim\sqrt{|V|}$ compared to the monolithic model. For a single epoch, back-propagation takes the same time as inference, which yields a speedup of $\sim\sqrt{|V|}$. As to the number of epochs, it is fair to guess that training the much smaller model and index networks ought to require fewer than the training of the much larger monolithic model. Hence the speedup in training is $\sim\sqrt{|V|}$, and probably much more.

In summary, factored networks bring significant advantages over monolithic networks for language modeling and similar tasks involving conditional probability distributions:
(1) the memory footprint is reduced by $\sim\sqrt{|V|}$;
(2) the inference time is also reduced by $\sim\sqrt{|V|}$;
(3) the time of a search for the K most likely tokens is reduced by $\sim\sqrt{|V|}/K$;
(4) the training time is reduced by at least $\sim\sqrt{|V|}$ Training The class model and the index model are trained independently, using standard techniques. Using the Split function, token sequences in a training corpus (such as corpus 203) are mapped to class and index sequences. A word from a one million-word vocabulary might be represented in a monolithic network by an embedding vector of a few hundred dimensions, or by a 1-hot vector with one million dimensions. The same word will be mapped to a class and an index, represented in a factored network by a 2-hot vector, which is a concatenation of a 1-hot class vector of size M, and a 1-hot vector of size N, for a combined size of M+N. With a well balanced choice of the classes, one can arrange that, say, M<2000 and N<2000, so that M+N<4000.

In FIG. 5, the token sequences in a corpus 503 are mapped 530 to equivalent sequences of (class, index) values represented as 2-hot vectors. These sequences are used to train 550 a class model 552, whose parameters are saved for subsequent use in inference. Similarly, in FIG. 6, the token sequences in a corpus 503 are mapped 530 to equivalent sequences of (class, index) values represented as 2-hot vectors. These sequences are used to train 670 a class model 672, whose parameters are saved for subsequent use in inference.

The mapping of a language corpus 503 to a sequence of (class, index) values in the same for training each of the class and the index model. However, the training of FIG. 5 and FIG. 6 are entirely independent. As discussed in FIG. 2, training the class model 220 (or 550) and training the index model 230 (or 670) can be carried out in either order, or in parallel, and without passing any data between the training procedures. In fact, it also possible that, according to given hyperparameters 204, the (as yet untrained) class model 552 and the (as yet untrained) index model 672 will be assigned different structures in number and size of layers, and recurrence properties. It is also possible that corpus 503 and corpus 603 will be different. Typically, however, corpus 503 and corpus 603 are the same, both being derived from the single corpus 203 of FIG. 2. In this common situation, modules 503 and 603 are one and the same, and the iterative feeding of training data can be shared. But training is separate from there on.

The training uses standard techniques. At each point in time, back-propagation starts with the loss function between the softmax output of the network and the observed output, represented as a 1-hot vector. Back-propagation then traces gradients through layers. For recurrent models, back-propagation also traces gradients back through time. Embodiments using LSTM networks (or GRU networks) are better at avoiding issues with vanishing gradients and exploding gradients, hence they may be preferred.

Multi-way Factoring

Figure 7:
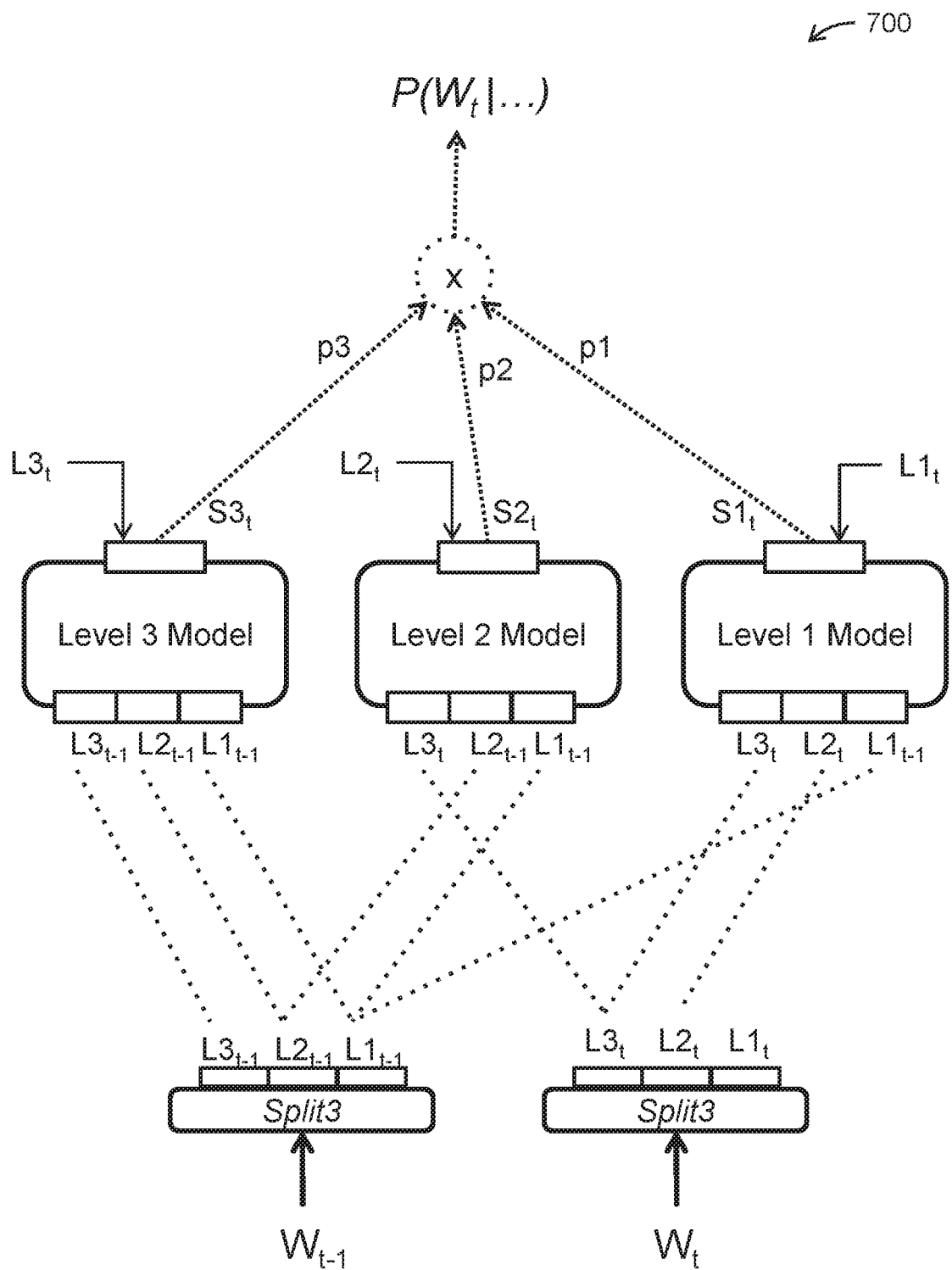
FIG. 7 shows a 3-way factored model, according to an embodiment.

The 2-way factoring technique presented so far can be generalized to multi-way factoring. For 3-way factoring, for example, assume that a token $W_t$ can be split into three components: $(L3_t, L2_t, L1_t)$—say, a superclass, a class, and an index. This notation starts to generalize to multi-level factoring. Each element at level I belongs to exactly one element at level I+1. FIG. 7 shows a 3-way factored model, according to an embodiment. The style and visual conventions in FIG. 7 are essentially identical to those of FIG. 1 and FIG. 3. All three models (Level 3, Level 2 and Level 1 Model) take as input a 3-hot vector. Each 3-hot vector is the result of concatenating the 1-hot encodings of a triplet of elements, at respective levels L3, L2 and L1.

The Level 3 Model is a recurrent network that computes in its output softmax layer the conditional probability of a next element $L3_t$, conditioned on the history of previous words. The history is received by the Level 3 recurrent network using the 3-hot input $(L3_{t-1}, L2_{t-1}, L1_{t-1})$. The posterior probability p3 of a given element $L3_t$ is obtained by looking up the softmax layer $S3_t$ at the position that corresponds to $L3_t$. The Level 2 Model is a recurrent network that computes in its output softmax layer the conditional probability of a next element $L2_t$, conditioned on the element $L3_t$ and on the history of previous words. Both element $L3_t$ and the history of previous words are received by the Level 2 recurrent network using the 3-hot input $(L3_t, L2_{t-1}, L1_{t-1})$. The posterior probability p2 of an element $L2_t$ is obtained by looking up the softmax layer $Sg_t$ at the position that corresponds to $L2_t$. The Level 1 Model is a recurrent network that computes in its output softmax layer the conditional probability of a next element $L1_t$, conditioned on the elements $L3_t$ and $L2_t$, and on the history of previous words. Elements $L3_t, L2_t$, and the history of previous words are received by the Level 1 recurrent network using the 3-hot input $(L3_t, L2_t, L1_{t-1})$. The posterior probability p1 of an element $L1_t$ is obtained by looking up the softmax layer $S1_t$ at the position that corresponds to $L1_t$.

Using the exact same notations as for FIG. 3, the steps that correspond to the three-way factored model of FIG. 3 are:
Get $(L3_{t-4}, L2_{t-1}, L1_{t-4})$ from previous iteration, or by initialization;
Get $(L3_t, L2_t, L1_t)$ by splitting $W_t$;
p3=lookup $(L3_t, L3\_Model\ L2_{t-1}, L1_{t-1}))$;
p2=lookup$(L2_t, L2\_Model\ (L3_t, L2_{t-1}, L1_{t-1}))$;
p1=lookup$(L1_t, L1\_Model\ (L3_t, L2_t, L1_{t-1}))$;
Return P(W[t]| . . . )=p3*p2*p1;

In the most efficient implementation of 3-way partitioning, the sizes of Level 3, Level 2 and Level 1 element sets are about equal, and on the order of the cubic root of |V|. It is easy to generalize this pattern to multi-way factoring. For K-way factoring, every token is represented by a K-tuple, and every model has a K-hot input. The input list for the Level J Model consists of the last J terms from the previous K-tuple (derived from $W_{t-1}$) followed by the first (K-J) terms from the current K-tuple (derived from $W_t$).

Class Partitioning

The choice of a good partitioning of words into classes is essential both for the efficiency and the accuracy of a factored network. This involves both partitioning metrics and class choice quality. The analysis of space and time costs shows that model efficiency suffers if there are too many classes, or too many words in any single class. Specifically, large values of either $$\frac{M}{\sqrt{|V|}}$$

or $$\frac{N}{\sqrt{|V|}}$$

should both be avoided for best performance. In particular, having classes of approximately equal sizes is beneficial.

Class choice quality is a more elusive factor. It is clear that assigning tokens to classes at random is a poor choice, because any structure or statistical pattern that exists in the language corpus will be randomly scattered, resulting in weak predictions and thus a high perplexity of the resulting model. The path to getting strong predictions and minimizing perplexity is to define classes that capture, to the degree possible, the regularities found in the language corpus. A good partitioning is one in which the number of indices is similar between classes and most classes are semantically homogeneous. There are several approaches to doing that. An approach can be used in isolation, or several approaches may be combined in interesting ways.

Clustering

A first approach to forming classes based on language regularities is to cluster tokens into classes according to certain features and certain distance metrics. Clustering attempts to maximize intra-cluster token similarity while minimizing inter-cluster similarity. Many clustering techniques are known in the art. Some, such as k-means clustering, are used in many fields. With k-means, the desired number of classes is set upfront; one might choose k~C.sqrt (|V|), where C is a constant reasonably close to 1, such as C=2, and perhaps even larger to accommodate unevenly sized groups. Other clustering techniques, like Brown clustering, have been developed specifically for the LM field.

Features eminently suitable for clustering include the word embedding vectors that result from the previous training of another network. Choosing a similarity metric (such as the cosine distance between embeddings) and a utility function that encourages good partitioning metrics is sufficient to allow clustering algorithms to proceed. Bottom-up agglomerative clustering, guided by hyperparameters that give bounds on M and N, or by a utility function that has the same effect, offers a potential solution. Brown clustering is another option.

Linguistic Features

Another approach to defining classes is based on linguistic concepts. A tagged lexicon that attaches syntactic and/or semantic attributes ("tags") to words in a vocabulary allows groups of words to be formed when they share a tag value. These groups could be used as classes if they were mutually disjoint. For example, there may be separate tags for syntactic categories such as nouns, verbs, prepositions, articles, and so on. It is clear that such groups capture regularities in a natural language corpus—regularities that would benefit a class model—so this is a good start. Unfortunately, groups based on tag values are not disjoint.

Some words, such as walk and jump can be both nouns and verbs. Besides, some groups can be very large, compared to a maximum class size such as C2.sqrt(V), where (say) C2=2. For example, the group of nouns and the group of verbs are both very large. The first group can be split into proper nouns and common nouns, and the second, into transitive verbs and intransitive verbs. However, these top-level divisions are not sufficient to make the groups small enough to be good classes. The groups could be subdivided further, but is that enough? The issues include: (1) overlapping groups; (2) excessively large groups; (3) too many groups.

Iterating Set Operations

In an embodiment, all three issues can be approached jointly by using a set of simple rules that are applied iteratively to a given set of groups, until a suitable class partitioning has been obtained. To deal with overlapping groups, for example, one can apply repeatedly the following "intersect rule": if a group A (a set of words) overlaps with a group B (another set of words), the two groups A and B can be removed and three other groups added instead, A∩B (the intersection of A and B), A-B (the elements of A not in B), and B-A (the elements of B not in A). The intersection rule can be applied iteratively until there are no more overlapping classes. However, in general, this will create too many classes, and they can be very small. To avoid this issue, two other transformation rules to deal with overlapping groups:

1. Intersect rule: add three groups A∩B, A-B, and B-A;
2. Subtract rule: add two groups A-B and A∩B;
3. Union rule: add the group A∪B For example, the intersect rule applied to the overlapping noun and verb groups results in three non-overlapping groups: nouns-but-not-verbs, verbs-but-not-nouns, and both-nouns-and-verbs. Taking into account the transitive vs. intransitive distinction (tag) for verbs further splits the groups that include verbs, so by now we have five groups based on the 3 tags (noun, verb, and transitive). So far this only involves at syntax, but morphology and especially semantics are also relevant. Per-domain vocabularies may be accessible outside of the previous lexicon. Proper names (that stand for entities) can be divided into people names, company names, product names, institution names, etc. Geographic entities further divide into countries, regions, cities, points of interest, and so on. There are many ways to slice large groups—actually so many that excessive application of the intersect rule (using all possible distinctions available from syntactic tags and semantic domain tags) results in many non-overlapping groups, call them fragments, which are the finest partitioning of the vocabulary into classes based on the set of tags in use. Fragment cannot be divided further based on tags. Such a fine partitioning is almost certain to have too many fragments to be used as classes, but it may still have large fragments. For example, the number of cities in the vocabulary or the number of people last names would typically run into many thousands for a million-word vocabulary. Using the subtract rule instead of the intersect rule can, in many cases, eliminate an overlap without increasing the number of groups. The union rule is one way to keep the number of classes low. But for large fragments the first three rules cannot help, and a fourth rule can be introduced:

4. Split rule: if a fragment A is too large, split it arbitrarily. But there are several other options, where the splitting may not be so arbitrary.

Searching for an Optimum Partitioning

An approach to class partitioning based on linguistic features and iterative transforms has many advantages, but it depends on tagged lexicons. In many instances, tags can be retrieved from the web, or by the application of POS (part-of-speech) algorithms. Other embodiments use syntactic and semantic groups in combination with the use of clusters from word embeddings, as described earlier. The clusters can also be treated as groups, and the two types of groups are merged into an initial set of groups that is further processed by iterating set operations, as described above.

Tag groups and cluster groups from embeddings can be combined in asymmetrical ways. In one variant, the system uses a hierarchical clustering technique, and clusters at any level can be used to split a linguistically-based group. In another variant, small groups (a.k.a. fragments) derived from tags by iterated application of the intersect rule alone can be used as seed clusters for an agglomerative (bottom-up) clustering approach with a metric based on word embeddings. This approach basically starts with syntactically and semantically homogeneous groups, some of which may be manually curated, and uses similarity of word embeddings to complete the task.

With all these techniques, the goal is to end up with classes of roughly the same size, while creating "quality groups"—groups that capture regularities in the language. This effort is worthwhile, because careful class formation is effective in reducing model perplexity, resulting in greater inference accuracy.

The FNN learns representations of words (embeddings), which can be clustered to re-partition the vocabulary. These embeddings can be extracted from the FNN by combining the class embedding and the index embedding of each word. An example of combination would be concatenation, with an optional scaling beforehand. The class and index embeddings are standard embeddings extracted from the last layer of the network. This operation can be iteratively applied until convergence.

Boilerplate

Practitioners skilled in the art will recognize many modifications and variations. The modifications and variations include any relevant combination of the disclosed features.

Various embodiments are methods that use the behavior of either or a combination of humans and machines. Method embodiments are complete wherever in the world most constituent steps occur. Some embodiments are one or more non-transitory computer readable media arranged to store such instructions for methods described herein. Whatever machine holds non-transitory computer readable media comprising any of the necessary code holds a complete embodiment. Some embodiments are physical devices such as semiconductor chips; hardware description language representations of the logical or functional behavior of such devices; and one or more non-transitory computer readable media arranged to store such hardware description language representations.

Descriptions herein reciting principles, aspects, and embodiments encompass both structural and functional equivalents thereof. Elements described herein as coupled have an effectual relationship realizable by a direct connection or indirectly with one or more other intervening elements.

Examples shown and described use certain spoken languages. Various embodiments operate, similarly, for other languages or combinations of languages. Examples shown and described use certain domains of knowledge. Various embodiments operate similarly for other domains or combinations of domains.

Some embodiments are screenless, such as an earpiece, which has no display screen. Some embodiments are stationary, such as a vending machine. Some embodiments are mobile, such as an automobile. Some embodiments are portable, such as a mobile phone. Some embodiments comprise manual interfaces such as keyboard or touch screens. Some embodiments comprise neural interfaces that use human thoughts as a form of natural language expression.

What is claimed is:

1. A method of estimating a posterior probability of a token, the token being uniquely associated with a class and an index within a class, the method comprising:
   mapping the token to a class and an index;
   accessing exactly one class model and exactly one index model wherein both of the exactly one class model and the exactly one index model are recurrent neural networks conditioned on sequences of previous tokens, including:
   using the class model, estimating a class posterior probability distribution of the token's class, conditioned on a given sequence of previous tokens; and
   using the index model, estimating an index posterior probability distribution of the token's index, conditioned on the class posterior probability distribution and the given sequence of previous tokens;
   estimating the posterior probability of the token as a product of the estimated class posterior probability distribution and the estimated index posterior probability distribution; and
   outputting the estimated posterior probability of the token.

2. The method of claim 1, wherein using the class model comprises inputting a 2-hot vector representing a previous class and a previous index to the class model.

3. The method of claim 1, wherein using the index model comprises inputting a 2-hot vector representing the class and a previous index to the index model.

4. The method of claim 1, further comprising:
   training the exactly one class model on class and index mapped token sequences from a language corpus; and
   training the exactly one index model on the class and index mapped token sequences.

5. The method of claim 1, wherein the token represents a word in a natural language.

6. A factored token prediction system comprising:
- a plurality of tokens from a training corpus, the plurality of tokens partitioned into classes, each token in the plurality of tokens uniquely mapped to a class and an index within its class;
- a class model trained on the training corpus to estimate the probability distribution of a current token's class conditioned on a sequence of previous tokens' classes and indices, wherein the class model is a recurrent neural network having a softmax layer that outputs the estimate of the probability distribution of the current token's class;
- an index model trained on the training corpus to estimate the probability distribution of the current token's index conditioned on the current token's class and the sequence of previous tokens' classes and indices,
- wherein the product of the estimated probability distribution of the current token's class and the estimated probability distribution of the current token's index provides an estimated probability of the current token conditioned on the sequence of previous tokens; and
- outputting the estimated probability of the current token.

7. The system of claim 6, wherein the class model is configured to receive a 2-hot vector as input, the 2-hot vector representing a previous token's class among all classes and representing the previous token's index among all indices.

8. The system of claim 6, wherein the class model and the index model are trained independently.

9. The system of claim 6, wherein the plurality of tokens are words in a natural language.

10. A method of training a factored prediction model from a corpus of token sequences, wherein each token in the corpus of token sequences has a class and an index within the class, the method comprising:
- training, based on token sequences from the corpus of token sequences, a class model that takes as input a sequence of previous classes and indices and estimates in a softmax layer a probability distribution of a current token's class, conditioned on previous tokens;
- training, based on token sequences from the corpus of token sequences, an index model that takes as input a current class and a sequence of previous classes and indices and estimates in another softmax layer a probability distribution of the current token's index, conditioned on the previous tokens;
- outputting the class model and the index model; and
- wherein the product of an estimated probability distribution of the current token's class and an estimated probability distribution of the current token's index provides an estimated probability of the current token conditioned on a sequence of previous input tokens.

11. The method of claim 10, wherein the class model is a recurrent neural network that takes as input a 2-hot vector obtained by combining a 1-hot vector for the previous class and a 1-hot vector for the previous index.

12. The method of claim 10, wherein the index model is a recurrent neural network and takes as input a 2-hot vector obtained by combining a 1-hot vector for the current class and a 1-hot vector for the previous index.

13. The method of claim 10, wherein tokens included in the corpus of token sequences comprise words in a natural language.

* * * * *